United States Patent
Wang et al.

(10) Patent No.: US 10,257,820 B2
(45) Date of Patent: Apr. 9, 2019

(54) METHOD AND DEVICE FOR TRANSMITTING DATA IN UNAUTHORIZED FREQUENCY BAND

(71) Applicant: CHINA ACADEMY OF TELECOMMUNICATIONS TECHNOLOGY, Beijing (CN)

(72) Inventors: Jiaqing Wang, Beijing (CN); Xueming Pan, Beijing (CN); Weijie Xu, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 15/509,695

(22) PCT Filed: Aug. 20, 2015

(86) PCT No.: PCT/CN2015/087677
§ 371 (c)(1),
(2) Date: Mar. 8, 2017

(87) PCT Pub. No.: WO2016/045472
PCT Pub. Date: Mar. 31, 2016

(65) Prior Publication Data
US 2017/0303246 A1    Oct. 19, 2017

(30) Foreign Application Priority Data
Sep. 26, 2014  (CN) .......................... 2014 1 0505035

(51) Int. Cl.
*H04W 72/04* (2009.01)
*H04L 5/00* (2006.01)
*H04W 16/14* (2009.01)

(52) U.S. Cl.
CPC ......... *H04W 72/042* (2013.01); *H04L 5/0007* (2013.01); *H04L 5/0044* (2013.01);
(Continued)

(58) Field of Classification Search
CPC .. H04W 72/042; H04W 16/14; H04L 5/0092; H04L 5/0007
See application file for complete search history.

(56) References Cited

U.S. PATENT DOCUMENTS 8,923,126 B2 * 12/2014 Wu ................... H04W 72/1289
                                                            370/235
2002/0086690 A1 * 7/2002 Takahashi ........... H04L 27/2602
                                                            455/502
(Continued)

FOREIGN PATENT DOCUMENTS

CN         101102506 A    1/2008
CN         101370165 A    2/2009
(Continued)

OTHER PUBLICATIONS

International Search Report for PCT/CN2015/087677 dated Nov. 24, 2015 and its English translation provided by WIPO.
(Continued)

*Primary Examiner* — Yemane Mesfin
*Assistant Examiner* — Henry Baron
(74) *Attorney, Agent, or Firm* — Ladas & Parry, LLP (57) ABSTRACT

The present disclosure relates to the field of mobile communications technology. A Method and a device for transmitting data in an unauthorized frequency band are provided. The method includes: determining a starting position of to-be-transmitted data in a radio frame in the unauthorized frequency band; determining position indication information based on the starting position; and transmitting the position indication information, to enable a terminal to
(Continued)

obtain the starting position of the to-be-transmitted data in the radio frame in the unauthorized frequency band based on the position indication information.

16 Claims, 5 Drawing Sheets

(52) U.S. Cl.
CPC .......... *H04L 5/0091* (2013.01); *H04L 5/0092* (2013.01); *H04W 16/14* (2013.01)

(56) References Cited

U.S. PATENT DOCUMENTS

| | | |
|---|---|---|
| 2011/0310830 A1 | 12/2011 | Wu et al. |
| 2012/0057490 A1 | 3/2012 | Park et al. |
| 2013/0121317 A1 | 5/2013 | Lee et al. |
| 2013/0250864 A1 | 9/2013 | Zhang et al. |
| 2013/0336302 A1 | 12/2013 | Lee et al. |
| 2014/0003387 A1 | 1/2014 | Lee et al. |
| 2014/0036853 A1 | 2/2014 | Kim et al. |
| 2014/0098774 A1 | 4/2014 | Gao et al. |
| 2014/0112289 A1 | 4/2014 | Kim et al. |
| 2014/0266815 A1 | 9/2014 | Chen et al. |
| 2014/0362797 A1 | 12/2014 | Aiba et al. |
| 2014/0378157 A1 | 12/2014 | Wei et al. |
| 2015/0264664 A1 | 9/2015 | Kawasaki et al. |
| 2015/0295690 A1 | 10/2015 | Takeda et al. |
| 2015/0296513 A1 | 10/2015 | Nogami et al. |
| 2016/0366699 A1* | 12/2016 | Zhang .................. H04W 74/00 |
| 2017/0086213 A1 | 3/2017 | Kalhan |
| 2017/0111913 A1 | 4/2017 | Li et al. |
| 2017/0280331 A1 | 9/2017 | Gou et al. |

FOREIGN PATENT DOCUMENTS

| | | |
|---|---|---|
| CN | 102440050 A | 5/2012 |
| CN | 103430467 A | 12/2013 |
| CN | 103765824 A | 4/2014 |
| JP | 2013/534094 A | 8/2013 |
| KR | 20100118067 A | 11/2010 |
| TW | 201401915 A | 1/2014 |
| WO | 2013/080446 A1 | 6/2013 |
| WO | 2013/094578 A1 | 6/2013 |
| WO | 2014/069381 A1 | 5/2014 |
| WO | 2014/073671 A1 | 5/2014 |
| WO | 2014/097358 A1 | 6/2014 |
| WO | 2015/179811 A1 | 11/2015 |
| WO | 2016/000167 A1 | 1/2016 |
| WO | 2016/029826 A1 | 3/2016 |

OTHER PUBLICATIONS

Written Opinion of the International Search Authority for PCT/CN2015/087677 dated Nov. 24, 2015 and its English translation provided by WIPO.
International Preliminary Report on Patentability (IPRP; Ch 1) for PCT/CN2015/087677 dated Apr. 6, 2017 and its English translation provided by WIPO.
From EP Application No. 15844481.0, Supplementary European Search Report and Search Opinion dated Sep. 4, 2017.
From TW Application No. 104130375, Office Action dated Sep. 26, 2016 with machine English translation provided by Google.
From PRC Application No. 201410505035.0, Office Action dated Feb. 11, 2018 with machine English translation from Global Dossier.
From KR Application No. 10-2017-7006741, Office Action dated Dec. 17, 2017 with machine English translation from Global Dossier.
From JP Application No. 2017-515894, Office Action dated Feb. 20, 2018 with English translation from Global Dossier.
From JP Application No. 2017-515894, Office Action dated Jun. 18, 2018 with machine English translation from Global Dossier.
3$^{rd}$ Generation Partnership Project; Technical Specification Group Radio Access Network; "Evolved Universal Terrestrial Radio Access (E-UTRA); Physical layer procedures" (Release 11), Jun. 2014, pp. 1-17.

* cited by examiner

METHOD AND DEVICE FOR TRANSMITTING DATA IN UNAUTHORIZED FREQUENCY BAND

CROSS-REFERENCE TO RELATED APPLICATIONS

The present application is the U.S. national phase of PCT Application PCT/CN2015/087677 filed on Aug. 20, 2015, which claims a priority to Chinese Patent Application No. 201410505035.0 filed on Sep. 26, 2014, the disclosures of which are incorporated herein by reference in their entireties.

TECHNICAL FIELD

The present disclosure relates to the field of mobile communications, and in particular, to a method and a device for transmitting data in an unauthorized frequency band.

BACKGROUND

Frequency band resources are in shortage due to increase in mobile data services, and mobile data services in large quantities may not be achievable through network deployment and service transmissions using only authorized frequency band resources. In view of above, it is optional to deploy transmissions of mobile data services using unauthorized frequency band resources, to enhance utilization ratio of frequency band resources and improve user experience. An unauthorized frequency band that serves as an auxiliary carrier assists an authorized frequency band that serves as a main carrier in achieving transmissions of mobile data services.

The unauthorized frequency band can be shared by various wireless communications systems such as Bluetooth and Wi-Fi, and the various wireless communications systems uses the shared unauthorized frequency band resources through competing for the resources. Hence, it is important and difficult in research how to ensure unlicensed long term evolutions (abbreviated as U-LTEs or LTE-Us) deployed by different service providers to co-exist or how to ensure different wireless communications systems such as LTE-U and Wi-Fi to co-exist.

Figure 1:
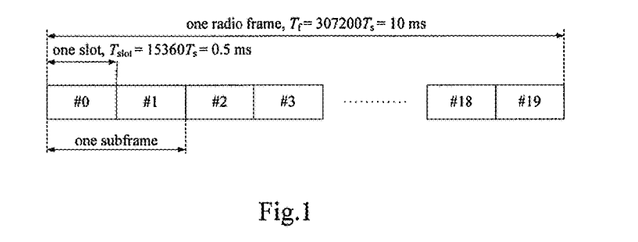
FIG. 1 is a schematic diagram of a first frame structure adopted in an FDD system in related art.
Figure 2:
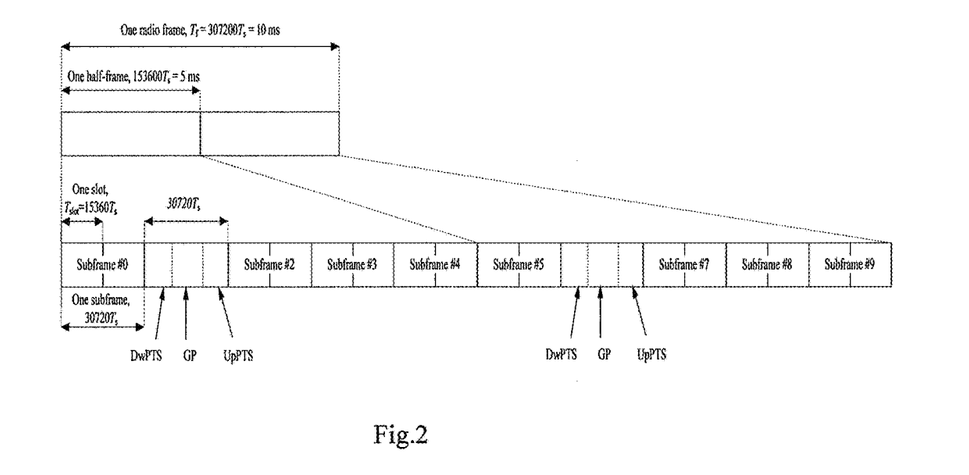
FIG. 2 is a schematic diagram of a second frame structure adopted in a TDD system in related art.

An LTE system may support frequency division duplexing (FDD) and time division duplexing (TDD) that adopt different frame structures. In the two different frame structures, each radio frame consists of ten subframes each last 1 ms. The FDD system adopts a first frame structure as shown in FIG. 1, and the TDD system adopts a second frame structure as shown in FIG. 2.

It can be found from the LTE frame structure, the data is transmitted in unit of subframe that lasts 1 ms. In the LTE-U, due to factors such as listen before talk (LBT) competitive access, data preparation time in a base station and radio frequency preparation time in a base station, a start time point for transmission of a LTE-U signal starts may be located at any position within one subframe, such that an incomplete subframe, i.e., a physical resource that lasts a period shorter than a length of one normal subframe, is transmitted. If no signal is sent using the incomplete subframe, the resource is of course to be taken by other nodes in situation of intense resource competition.

To ensure fair competition between LTE-U and Wi-Fi, the LTE-U may be designed with each transmission lasting 10 ms, and each transmission is better not longer than 40 ms. In the case that the LTE-U is designed with each transmission lasting about 10 ms and any incomplete subframe is not used for transmission, transmission efficiency of the LTE-U is greatly decreased. In the case that an incomplete subframe is transmitted on a resource that is not available for transmitting a complete subframe and the incomplete subframe is used in data transmission, the data transmission efficiency can be enhanced and resource is not wasted. However, there is no technical solution for performing data transmission using incomplete subframe in an LTE unauthorized frequency band.

In sum, no solution is given in related art to achieve data transmission using incomplete subframe in the unauthorized frequency band.

SUMMARY

Methods and devices for transmitting data in an unauthorized frequency band are provided according to embodiments of the present disclosure, to achieve transmitting data in an incomplete subframe in the unauthorized frequency band.

A method for transmitting an incomplete subframe is provided according to embodiments of the present disclosure, including: determining a starting position of to-be-transmitted data in a radio frame in the unauthorized frequency band; determining position indication information based on the starting position; and transmitting the position indication information, to enable a terminal to obtain the starting position of the to-be-transmitted data in the radio frame in the unauthorized frequency band based on the position indication information.

Optionally, the position indication information is a sequence agreed on by a network device and the terminal in advance.

Optionally, a symbol carrying the sequence is located at a position before the to-be-transmitted data in the radio frame in time domain and there are N symbols between the symbol carrying the sequence and symbols carrying the to-be-transmitted data, wherein the sequence occupies all bandwidth or a specified partial bandwidth in frequency domain and N is an integer equal to or larger than 0; or the sequence occupies a specified partial bandwidth and a symbol carrying the sequence overlaps a starting symbol of the to-be-transmitted data.

Optionally, the position indication information is transmitted via a signaling, the signaling is carried on a specified symbol in the radio frame, and the specified symbol is agreed on by a network device and the terminal in advance.

Optionally, the signaling carried on the specified symbol occupies a partial bandwidth of the specified symbol.

Optionally, the signaling is carried on an auxiliary carrier in the unauthorized frequency band, or carried on a main carrier in an authorized frequency band.

Optionally, data is transmitted in a physical downlink shared channel (PDSCH) and an enhanced physical downlink control channel (ePDCCH) in the radio frame in a frequency division multiplexing manner, the PDSCH and the ePDCCH have an identical starting position and an identical ending position in time domain, and the starting position of the PDSCH and the ePDCCH in the time domain is located in an L1/L2 control channel region of a complete subframe corresponding to the radio frame, or may be located at any position outside the L1/L2 control channel region of the complete subframe corresponding to the radio frame.

Optionally, data is transmitted in a control channel and a PDSCH in the radio frame in a time division multiplexing manner, the control channel is located at a position after the PDSCH, and the control channel comprises at least a physical downlink control channel (PDCCH) and a physical control format indicator channel (PCFICH).

Optionally, the starting position of the to-be-transmitted data in the radio frame is a starting symbol of a PDSCH.

A method for transmitting data on an unauthorized frequency band is provided according to embodiments of the present disclosure, including: receiving, by a terminal, position indication information of a radio frame in an unauthorized frequency band; and determining, by the terminal, a starting position of to-be-transmitted data in the radio frame in the unauthorized frequency band based on the position indication information.

Optionally, the position indication information is a sequence agreed on by a network device and the terminal in advance.

Optionally, determining by the terminal the starting position of the to-be-transmitted data in the radio frame in the unauthorized frequency band based on the position indication information comprises: determining, by the terminal, the sequence on a symbol in the radio frame that is located at a position before symbols carrying the to-be-transmitted data and is N symbols away from the symbols carrying the to-be-transmitted data, wherein the sequence occupies all bandwidth or a specified partial bandwidth in frequency domain and N is an integer equal to or larger than 0; or determining, by the terminal, the sequence on a starting symbol of the to-be-transmitted data, wherein the sequence occupies a specified partial bandwidth.

Optionally, the position indication information is transmitted via a signaling, the signaling is carried on a specified symbol in the radio frame and the specified symbol is agreed on by a network device and the terminal in advance.

Optionally, receiving by the terminal the position indication information of the radio frame in the unauthorized frequency band includes: determining, by the terminal, the signaling based on a partial bandwidth of the specified symbol.

Optionally, receiving by the terminal the position indication information of the radio frame in the unauthorized frequency band includes: obtaining, by the terminal, the signaling from an auxiliary carrier in the unauthorized frequency band or from a main carrier in an authorized frequency band.

Optionally, data is transmitted in a PDSCH and an ePDCCH in the radio frame in a frequency division multiplexing manner, the PDSCH and the ePDCCH have an identical starting position and an identical ending position in time domain, and the starting position of the PDSCH and the ePDCCH in the time domain is located in an L1/L2 control channel region of a complete subframe corresponding to the radio frame, or is located at any position outside the L1/L2 control channel region of the complete subframe corresponding to the radio frame.

Optionally, data is transmitted in a control channel and a PDSCH in the radio frame in a time division multiplexing manner, the control channel is located at a position after the PDSCH, and the control channel comprises at least a physical downlink control channel (PDCCH) and a physical control format indicator channel (PCFICH).

Optionally, the starting position of the to-be-transmitted data in the radio frame is a starting symbol of a PDSCH.

A network device is provided according to embodiments of the present disclosure, including: a starting position determining unit, configured to determine a starting position of to-be-transmitted data in a radio frame in an unauthorized frequency band; a position indication information determining unit, configured to determine position indication information based on the starting position; and a transmitting unit, configured to transmit the position indication information, to enable a terminal to determine the starting position of the to-be-transmitted data in the radio frame in the unauthorized frequency band based on the position indication information.

Optionally, the position indication information is a sequence agreed on by the network device and the terminal in advance.

Optionally, a symbol carrying the sequence is located at a position before the to-be-transmitted data in the radio frame in time domain and there are N symbols between the symbol carrying the sequence and symbols carrying the to-be-transmitted data, wherein the sequence occupies all bandwidth or a specified partial bandwidth in frequency domain and N is an integer equal to or larger than 0; or the sequence occupies a specified partial bandwidth, and a symbol carrying the sequence overlaps a starting symbol of the to-be-transmitted data.

Optionally, the position indication information is transmitted via a signaling, the signaling is carried on a specified symbol in the radio frame, and the specified symbol is agreed on by the network device and the terminal in advance.

Optionally, the signaling carried on the specified symbol occupies a portion of the bandwidth of the specified symbol.

Optionally, the signaling is carried on an auxiliary carrier in the unauthorized frequency band, or is carried on a main carrier in an authorized frequency band.

Optionally, data is transmitted in a PDSCH and an ePDCCH in the radio frame in a frequency division multiplexing manner, the PDSCH and the ePDCCH have an identical starting position and an identical ending position in time domain, and the starting position of the PDSCH and the ePDCCH in the time domain is located in an L1/L2 control channel region of a complete subframe corresponding to the radio frame, or is located at any position outside the L1/L2 control channel region of the complete subframe corresponding to the radio frame.

Optionally, data is transmitted in a control channel and a PDSCH in the radio frame in a time division multiplexing manner, the control channel is located at a position after the PDSCH, and the control channel comprises at least a PDCCH and a PCFICH.

Optionally, the starting position of the to-be-transmitted data in the radio frame is a starting symbol of a PDSCH.

A terminal is provided according to embodiments of the present disclosure, including: a receiving unit, configured to receive position indication information of a radio frame in an unauthorized frequency band; and a determining unit, configured to determine a starting position of to-be-transmitted data in the radio frame in the unauthorized frequency band based on the position indication information.

Optionally, the position indication information is a sequence agreed on by a network device and the terminal in advance.

Optionally, the determining unit is configured to: determine the sequence on a symbol in the radio frame that is located at a position before symbols carrying the to-be-transmitted data and is N symbols away from the symbols carrying the to-be-transmitted data, wherein the sequence occupies all bandwidth or a specified partial bandwidth in frequency domain and N is an integer equal to or larger than 0; or determine the sequence on a starting symbol of the to-be-transmitted data, wherein the sequence occupies a specified partial bandwidth.

Optionally, the position indication information is transmitted via a signaling, the signaling is carried on a specified symbol in the radio frame and the specified symbol is agreed on by a network device and the terminal in advance.

Optionally, the receiving unit is configured to determine the signaling based on a partial bandwidth of the specified symbol.

Optionally, the receiving unit is configured to obtain the signaling from an auxiliary carrier in the unauthorized frequency band or from a main carrier in an authorized frequency band.

Optionally, data is transmitted in a PDSCH and an ePDCCH in the radio frame in a frequency division multiplexing manner, the PDSCH and the ePDCCH have an identical starting position and an identical ending position in time domain, and the starting position of the PDSCH and the ePDCCH in the time domain is located in an L1/L2 control channel region of a complete subframe corresponding to the radio frame, or is located at any position outside the L1/L2 control channel region of the complete subframe corresponding to the radio frame.

Optionally, data is transmitted in a control channel and a PDSCH in the radio frame in a time division multiplexing manner, the control channel is located at a position after the PDSCH, and the control channel comprises at least a PDCCH and a PCFICH.

Optionally, the starting position of the to-be-transmitted data in the radio frame is a starting symbol of a PDSCH.

With the methods according to the embodiments of the present disclosure, the terminal can be informed of the starting position of the to-be-transmitted data in the radio frame in the unauthorized frequency band via the position indication information, such that the terminal can determine the starting position of the to-be-transmitted data in the radio frame based on the position indication information, so as to receive the data in an accurate manner.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof.

In an LTE system, in the case that to-be-transmitted data is transmitted using an incomplete subframe in an unauthorized frequency band, a terminal cannot determine a starting position of the to-be-transmitted data in the received incomplete subframe. In the case that a network device competes for resources, due to factors such as LBT competitive access, data preparation time in the network device and radio frequency preparation time in the network device, it is frequently that the network device may not transmit a complete subframe, such that an incomplete subframe needs to be used for data transmission. The length of the incomplete subframe is shorter than that of an LTE subframe and may have at most 13 available orthogonal frequency division multiplexing (OFDM) symbols. The starting position of the transmitted data is uncertain or is changeable while an ending position of the transmitted data is known or predetermined, the terminal cannot obtain the transmitted data in the case that it cannot determine the starting position of the transmitted data in the incomplete subframe.

In view of the technical problem that the terminal cannot determine the starting position of the to-be-transmitted data in the received radio frame, according to some embodiments of the present disclosure, when transmitting a radio frame, a network device informs a terminal of a starting position of to-be-transmitted data in the radio frame via a position indication information, such that the terminal can determine a starting position of the transmitted data in an incomplete subframe, and thus can obtain data in the incomplete subframe in an accurate manner.

The present disclosure provides in some embodiments a method for transmitting data in an unauthorized frequency band at a network side and a method for transmitting data on an unauthorized frequency band at a terminal side. These methods at the network side and at the terminal side can be used separately or in combination. The methods at the network side and at the terminal side are described respectively hereinafter.

Any method according to embodiments of the present disclosure can be applied to various mobile communications system, and herein the application of the method in the LTE system is taken as an example, and applications of the method in other mobile communications system are not described. Since the LTE system is taken as the example, the term "symbol" in embodiments of the present disclosure is referred to OFDM symbol.

In the following, detailed descriptions are given based on drawings and embodiments of the present disclosure.

Figure 3:
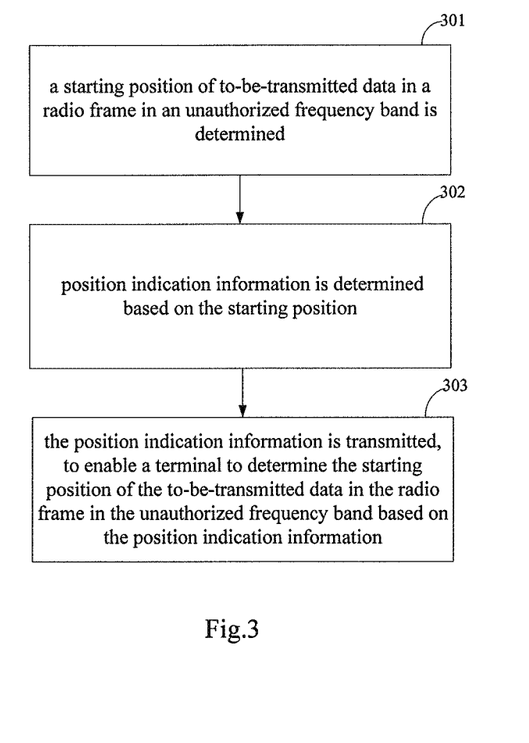
FIG. 3 is a flow chart of a method for transmitting data in an unauthorized frequency band according to some embodiments of the present disclosure.

FIG. 3 is a flow chart of a method for transmitting data in an unauthorized frequency band according to some embodiments of the present disclosure. The method is executed by a network device. The network device has a network access function, such as a base station; however, the network device in the embodiments is not limited to the base station. As shown in FIG. 3, the method may include steps 301-303.

In step 301, a starting position of to-be-transmitted data in a radio frame in an unauthorized frequency band is determined.

In step 302, position indication information is determined based on the starting position.

In step 303, the position indication information is transmitted, to enable a terminal to determine the starting position of the to-be-transmitted data in the radio frame in the unauthorized frequency band based on the position indication information.

In the LTE system, the to-be-transmitted data is mapped into a PDSCH for transmission. Hence, the starting position of the to-be-transmitted data may be referred to a starting OFDM symbol of the PDSCH for transmitting the data. The PDSCH and an ePDCCH can be frequency-division multiplexed; in such a case, the PDSCH and the ePDCCH may have an identical starting position in time domain, and the starting position of the to-be-transmitted data may be referred to as a starting OFDM symbol of the ePDCCH.

The starting position of the to-be-transmitted data indicated by the position indication information refers to a sequence number of a starting symbol of the to-be-transmitted data in the radio frame, or refers to a relative position of the starting symbol in the radio frame. The relative position refers to the number of symbols from a starting point of the radio frame or a subframe carrying the to-be-transmitted data to the starting symbol of the to-be-transmitted data, or refers to the number of symbols from the starting symbol of the to-be-transmitted data to an ending point of the radio frame or the subframe, or may refer to other substantially equivalent information.

The position indication information determined in step 302 may be a sequence agreed on by the network device and the terminal, or may be transmitted via a signaling.

On one hand, if the position indication information is a sequence, the sequence needs to be agreed on by the network device and the terminal in advance. That is, the sequence is already known by both the network device and the terminal. The sequence may be stored locally at the terminal or may be generated at the terminal. In one available approach, the sequence is constructed by taking a pseudo-noise (PN) sequence or a constant amplitude zero auto correlation (CAZAC) sequence as a basic sequence. The sequence may be generated through other approaches, which are not detailed herein.

In step 303, in the case that the network device transmits the sequence, the sequence occupies all bandwidth or specified partial bandwidth in frequency domain.

In the case that the sequence occupies all bandwidth or specified partial bandwidth in frequency domain, a symbol carrying the sequence is located at a position before the to-be-transmitted data in time domain and there are N symbols between the symbol carrying the sequence and symbols carrying the to-be-transmitted data, where N is an integer equal to or larger than 0. The value of N is agreed on by the network device and the terminal in advance. For example, the network device transmits the sequence on an OFDM symbol prior to the starting OFDM symbol in the PDSCH for transmitting the data.

In the case that the sequence occupies the specified partial bandwidth, the symbol carrying the sequence may overlap the starting symbol of the to-be-transmitted data. For example, the network device transmits the sequence on the starting OFDM symbol in the PDSCH for transmitting the data, and the sequence and the PDSCH occupy different bandwidths. In this case, preferably, the frequency band occupied by the sequence is at a center frequency point or is near the center frequency point.

On another hand, in the case that the position indication information is transmitted via a signaling, the signaling may be carried on a specified symbol in the radio frame. The specified symbol is agreed on by the network device and the terminal in advance. In this case, the position indication information is sent at a determined position and the terminal does not need to perform blind detection. Optionally, the specified symbol is on the last symbol of the incomplete subframe.

The signaling may be carried on an auxiliary carrier in an unauthorized frequency band, or may be carried on a main carrier in an authorized frequency band.

The signaling occupies all bandwidth or specified partial bandwidth in frequency domain. Optionally, the length of the position indication information is typically 4 bits. The position indication information is used to indicate the sequence number of the starting OFDM symbol of the PDSCH, or to indicate a relative position of the sequence number of the starting OFDM symbol of the PDSCH in the incomplete subframe. In the case that the signaling occupies the specified partial bandwidth, the signaling and other information such as a control channel or to-be-transmitted data may be carried on an identical symbol in a frequency division multiplexing manner. For example, the signaling and a PCFICH in the control channel may be carried on an identical symbol in a frequency division multiplexing manner. For another example, the signaling may be transmitted on an ending OFDM symbol of the PDSCH, and the signaling and the PDSCH are transmitted in a frequency division multiplexing manner.

During data transmission in a subframe in the LTE system, an L1/L2 control channel is carried on the first P OFDM symbols of a complete subframe, where P is smaller than or equal to 4; through the L1/L2 control channel, data may not be completely transmitted in an incomplete subframe in an unauthorized frequency band, the terminal may fail in obtaining the L1/L2 control channel or may merely obtain a part of the L1/L2 control channel, thereby failing in obtaining the data transmitted in the radio frame through demodulation correctly. In embodiments of the present disclosure, a solution in R8/R9 of transmitting a control channel in a conventional L1/L2 control channel region is not adopted; instead, one of the following two solutions is adopted.

In a first solution, the ePDCCH and the PDSCH are frequency-division multiplexed.

In a second solution, a control channel and the PDSCH are time-division multiplexed. The control channel at least includes a physical downlink control channel (PDCCH) and the PCFICH, and may include other kinds of control channels.

In the case that the ePDCCH and the PDSCH are frequency-division multiplexed, the PDSCH and the ePDCCH have an identical starting position and an identical ending position in time domain. The starting position of the PDSCH and the ePDCCH may be located in the L1/L2 control channel region of a complete subframe corresponding to the incomplete subframe, or may be located at any position outside the L1/L2 control channel region of the complete subframe corresponding to the incomplete subframe. In the case that there exists a part of the L1/L2 control channel region of the complete subframe corresponding to the incomplete subframe, the partial L1/L2 control channel region may be used to transmit data or the position indication information. The position indication information needs to indicate the starting position of the ePDCCH and the PDSCH.

In the case that the control channel and the PDSCH are time-division multiplexed, the control channel is carried on a symbol after symbols carrying the PDSCH, where the control channel carries the PDCCH, the PCFICH and other control information. Optionally, the PCFICH carried on the control channel is carried on the last symbol of the incomplete subframe. In the case that the position indication information is sent via a signaling, the signaling and the PCFICH may be carried on an identical symbol in a frequency division multiplexing manner.

With the method according to the above embodiments of the present disclosure, the terminal is informed of the starting position of the transmitted data in the radio frame in the unauthorized frequency band through the position indication information, such that the terminal can determine the starting position of the transmitted data in the radio frame based on the position indication information, so as to receive the data in an accurate manner.

Figure 4:
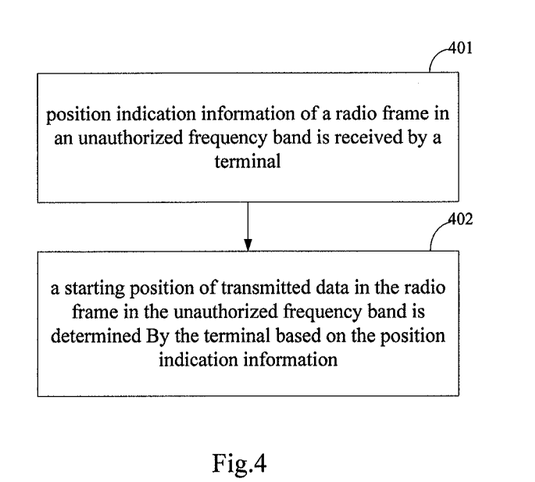
FIG. 4 is a flow chart of another method for transmitting data in an unauthorized frequency band according to some embodiments of the present disclosure.

FIG. 4 is a flow chart of a method for transmitting data in an unauthorized frequency band according to some embodiments of the present disclosure. The flow is executed by a terminal. The terminal may be any terminal having a wireless communication function, such as a mobile phone.

In the LTE system, in the case that a subframe adopts a normal cyclic prefix, the terminal, in reception of one subframe, may determine the head of an ideal complete LTE subframe by counting 14 OFDM symbols forwardly from the end of the subframe. Firstly, the terminal may demodulate the L1/L2 control channel region; if the demodulation is failed, the terminal determines that the received subframe is an incomplete subframe, and a mode for incomplete subframe is initiated.

The method may include steps 401-402.

In step 401, position indication information of a radio frame in an unauthorized frequency band is received.

In step 402, a starting position of transmitted data in the radio frame in the unauthorized frequency band is determined based on the position indication information.

The meaning and transmitting approach of the position indication information herein are identical to those of the position indication information in FIG. 3, which are not repeated herein.

In the case that the position indication information is a sequence agreed on by the network device, and the terminal detects the sequence in the radio frame in step 401, in step 402, the terminal can determine, based on a value of N being agreed on and a position of a symbol carrying the sequence, the starting position of transmitted data in the received radio frame, and thus can obtain the data through demodulation.

In the case that the position indication information is transmitted via a signaling, in step 401, the terminal may obtain the signaling and a subframe corresponding to the signaling from an auxiliary carrier in the unauthorized frequency band or from a main carrier in an authorized frequency band, such that the terminal may obtain the starting position of transmitted data in the subframe.

For example, in the LTE system, the signaling indicating the position indication information is agreed on to be transmitted on K resource blocks (RBs) in the middle of the frequency band on the last OFDM symbol of an incomplete subframe, where K is an integer equal to or larger than 0. In case of achieving time and frequency synchronization through approaches such as signal detection, the terminal may determine an end of the incomplete subframe, and detect the signaling on the K RBs in the middle of the frequency band on the last OFDM symbol of the incomplete subframe, so as to obtain the starting position of transmitted data in the incomplete subframe based on the signaling.

As disclosed above, the network device may adopt a solution in which the ePDCCH and the PDSCH are frequency-division multiplexed or may adopt another solution in which a control channel and the PDSCH are time-division multiplexed. The control channel at least includes the PDCCH and the PCFICH, and may further include other control channels.

In the case that the control channel and the PDSCH are time-division multiplexed, for example, the PCFICH may be transmitted on the last OFDM symbol of the incomplete subframe, =since the end of the incomplete subframe is known, the terminal, in reception of the incomplete subframe, may determine a range of the control channel based on the PCFICH with a conventional approach in the LTE system, and may demodulate the PDSCH based on the position indication information.

With the above method according to the embodiments of the present disclosure, after the terminal receives the radio frame in the unauthorized frequency band, the starting position of the transmitted data in the radio frame can be determined based on the position indication information sent from the network device; accordingly, the terminal can determine the starting position of the transmitted data in the radio frame based on the position indication information, so as to receive the data in an accurate manner.

As described above, the position indication information can be implemented in two ways, and the control channel and the PDSCH can be multiplexed in two ways. In the following, by taking the LTE system as an example, schematic structures of incomplete subframes under various combination solutions are described in conjunction with FIG. 5-FIG. 8.

Figure 5:
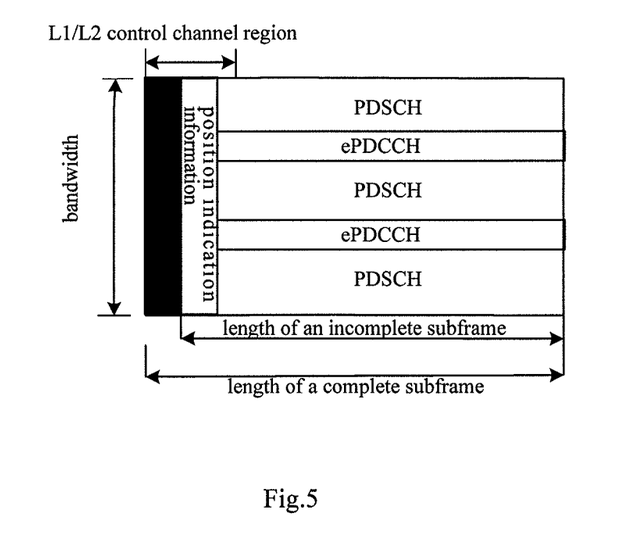
FIG. 5 is a schematic structural diagram of a first incomplete subframe in an unauthorized frequency band according to some embodiments of the present disclosure.

As shown in FIG. 5, the to-be-transmitted data is mapped to the PDSCH for transmission, and the PDSCH and the ePDCCH are frequency-division multiplexed. The PDSCH and the ePDCCH have an identical starting position in time domain, wherein the identical starting position is located in an L1/L2 control channel region of a complete subframe corresponding to the incomplete subframe. The position indication information is a sequence agreed on by the network device and the terminal in advance. An OFDM symbol carrying the sequence is located at a position previous to and adjacent to a starting OFDM symbol of the PDSCH. The sequence occupies all of the bandwidth.

In a process of receiving the incomplete subframe by the terminal in the unauthorized frequency band, in the case that the terminal obtains the sequence by demodulating the incomplete subframe, the terminal may determine the OFDM symbol next to the OFDM symbol carrying the sequence to be a starting symbol of the PDSCH. Therefore, the terminal may receive and demodulate the PDSCH based on the determined starting symbol of the PDSCH.

Figure 6:
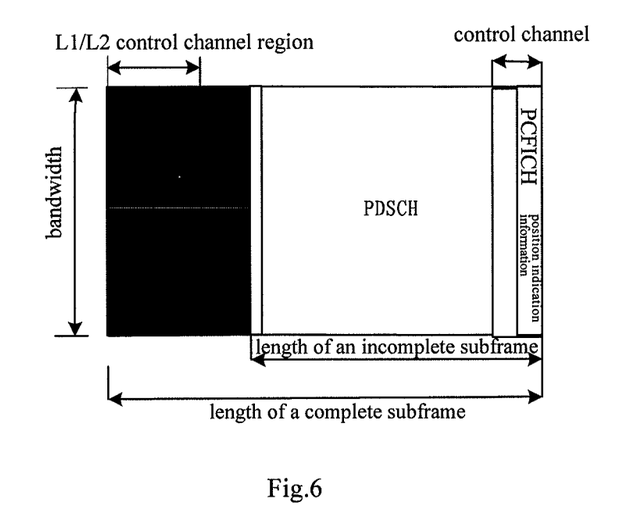
FIG. 6 is a schematic structural diagram of an second incomplete subframe in an unauthorized frequency band according to some embodiments of the present disclosure.

As shown in FIG. 6, the to-be-transmitted data is mapped to the PDSCH for transmission, and the control channel and the PDSCH are time-division multiplexed. A starting point of the PDSCH in time domain is located at a position outside an L1/L2 control channel region of a complete subframe corresponding to the incomplete subframe. The position indication information is transmitted via a signaling. The signaling occupies a portion of the bandwidth. The signaling and the PCFICH that is in the control channel occupy the last OFDM symbol of the incomplete subframe in a frequency division multiplexing manner. The control channel is located at a position after the PDSCH. In FIG. 6, it is exemplarily illustrated that the position indication information can be carried on the last OFDM symbol of the incomplete subframe, while the frequency band occupied by the position indication information is not limited.

In reception of the signaling, the terminal may determine a starting symbol of the PDSCH based on the signaling. Then, the terminal can receive and demodulate the PDSCH based on the determined starting symbol of the PDSCH.

Figure 7:
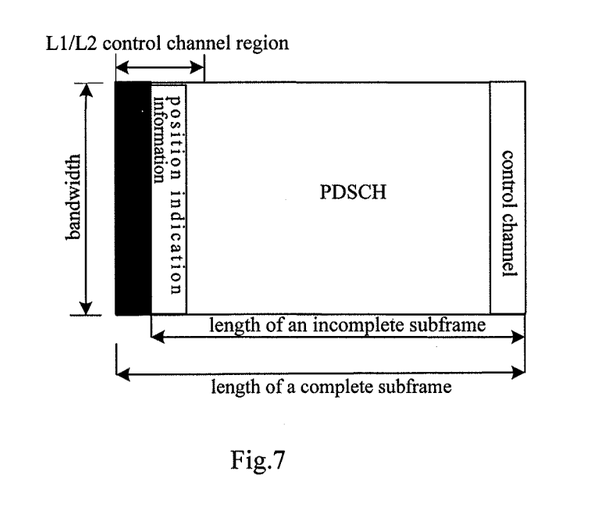
FIG. 7 is a schematic structural diagram of a third incomplete subframe in an unauthorized frequency band according to some embodiments of the present disclosure.

As shown in FIG. 7, the to-be-transmitted data is mapped to the PDSCH for transmission, and the control channel and the PDSCH are time-division multiplexed. A starting point of the PDSCH in time domain is located within an L1/L2 control channel region of a complete subframe corresponding to the incomplete subframe. The position indication information is a sequence agreed on by the network device and the terminal in advance. The sequence occupies a portion of the bandwidth, and an OFDM symbol carrying the sequence overlaps a starting OFDM symbol of the PDSCH. Optionally, the sequence may occupy all of the bandwidth.

In a process of the terminal receiving the incomplete subframe in the unauthorized frequency band, in the case that the terminal obtains the sequence by demodulating the incomplete subframe, the terminal may determine the OFDM symbol carrying the sequence to be the starting symbol of the PDSCH. Therefore, the terminal may receive and demodulate data in the PDSCH based on the determined starting symbol of the PDSCH.

Figure 8:
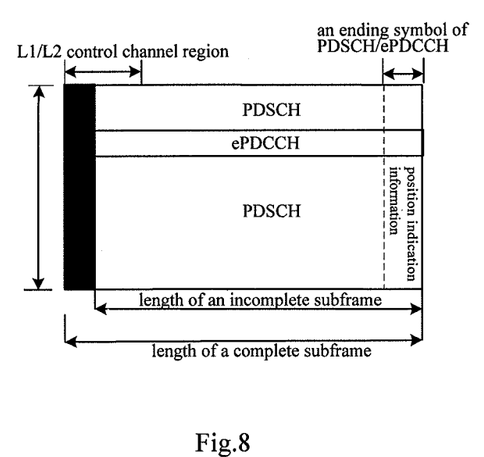
FIG. 8 is a schematic structural diagram of a fourth incomplete subframe in an unauthorized frequency band according to some embodiments of the present disclosure.

As shown in FIG. 8, the to-be-transmitted data is mapped to the PDSCH for transmission, and the PDSCH and the ePDCCH are frequency-division multiplexed. The PDSCH and the ePDCCH have an identical starting position in time domain, the identical starting position is located in an L1/L2 control channel region of a complete subframe corresponding to the incomplete subframe. The position indication information is transmitted via a signaling. The signaling occupies a portion of the bandwidth, and is carried on an ending OFDM symbol of the PDSCH and/or the ePDCCH. The signaling and the PDSCH and/or the signaling and the ePDCCH are transmitted in a frequency division multiplexing manner. In FIG. 8, it is exemplarily illustrated that the position indication information and the PDSCH and/or the position indication information and the ePDCCH can be carried on the ending OFDM symbol of the PDSCH and/or the ePDCCH, where a frequency band occupied by the position indication information is not limited.

In reception of the signaling, the terminal may determine a starting symbol of the PDSCH based on the signaling. Then, the terminal may receive and demodulate the PDSCH based on the determined starting symbol of the PDSCH.

Corresponding to the above described methods, a network device and a terminal are further provided according to some embodiments of the present disclosure. Details about the network device and the terminal can be know with reference to the described methods and are not given herein.

Figure 9:
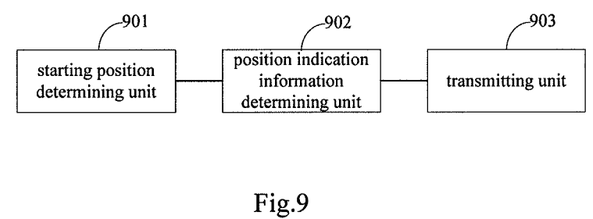
FIG. 9 is a structural diagram of a network device according to some embodiments of the present disclosure.

FIG. 9 is a schematic structural diagram of a network device according to some embodiments of the present disclosure. The network device includes: a starting position determining unit 901, used to determine a starting position of to-be-transmitted data in a radio frame in an unauthorized frequency band; a position indication information determining unit 902, used to determine position indication information based on the starting position; and a transmitting unit 903, used to transmit the position indication information, to enable a terminal to determine the starting position of the to-be-transmitted data in the radio frame in the unauthorized frequency band based on the position indication information.

Optionally, the position indication information is a sequence agreed on by the network device and the terminal in advance.

Optionally, a symbol carrying the sequence is located at a position before the to-be-transmitted data in time domain and there are N symbols between the symbol carrying the sequence and symbols carrying the to-be-transmitted data, where the sequence occupies all bandwidth or a specified partial bandwidth in frequency domain and N is an integer equal to or larger than 0. Or, the sequence occupies a specified partial bandwidth, and the symbol carrying the sequence may overlap a starting symbol of the to-be-transmitted data.

Optionally, the position indication information is transmitted via a signaling. The signaling is carried on a specified symbol in the radio frame. The specified symbol is agreed on by the network device and the terminal in advance.

Optionally, the signaling occupies a portion of the bandwidth of the specified symbol.

Optionally, the signaling is carried on an auxiliary carrier in an unauthorized frequency band, or is carried on a main carrier in an authorized frequency band.

Optionally, an ePDCCH and a PDSCH in the radio frame are transmitted in a frequency division multiplexing manner, the PDSCH and the ePDCCH have an identical starting position and an identical ending position in time domain. The starting position of the PDSCH and the ePDCCH in the time domain may be located in the L1/L2 control channel region of a complete subframe corresponding to the radio frame, or may be located at any position outside the L1/L2 control channel region of the complete subframe corresponding to the radio frame.

Optionally, a control channel and the PDSCH in the radio frame are transmitted in a time division multiplexing manner, the control channel is located at a position after the PDSCH, and the control channel includes at least a PDCCH and a PCFICH.

Optionally, a starting position of the to-be-transmitted data in the radio frame is a starting symbol of the PDSCH.

Figure 10:
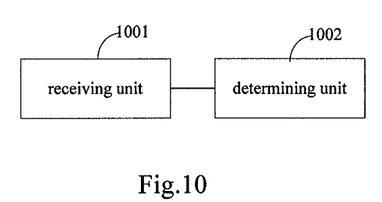
FIG. 10 is a structural diagram of a terminal according to some embodiments of the present disclosure.

FIG. 10 illustrates a terminal according to some embodiments of the present disclosure. The terminal includes: a receiving unit 1001, used to receive position indication information of a radio frame in an unauthorized frequency band; and a determining unit 1002, used to determine a starting position of to-be-transmitted data in the radio frame in the unauthorized frequency band based on the position indication information.

Optionally, the position indication information is a sequence agreed on by a network device and the terminal in advance.

Optionally, the determining unit 1002 is used to: determine the sequence on a symbol in the radio frame that is located at a position before symbols carrying the to-be-transmitted data and is N symbol(s) away from the symbols carrying the to-be-transmitted data, where the sequence occupies all bandwidth or a specified partial bandwidth in frequency domain and N is an integer equal to or larger than 0; or determine the sequence on a starting symbol of the to-be-transmitted data, where the sequence occupies a specified partial bandwidth.

Optionally, the position indication information is transmitted via a signaling. The signaling is carried on a specified symbol in the radio frame and the specified symbol is agreed on by the network device and the terminal in advance.

Optionally, the receiving unit 1001 is used to determine the signaling based on a partial bandwidth of the specified symbol.

Optionally, the receiving unit 1001 is used to obtain the signaling from an auxiliary carrier in an unauthorized frequency band or from a main carrier in an authorized frequency band.

Optionally, an ePDCCH and a PDSCH in the radio frame are transmitted in a frequency division multiplexing manner, the PDSCH and the ePDCCH have an identical starting position and an identical ending position in time domain. The starting position of the PDSCH and the ePDCCH in the time domain may be located in the L1/L2 control channel region of a complete subframe corresponding to the radio frame, or may be located at any position outside the L1/L2 control channel region of the complete subframe corresponding to the radio frame.

Optionally, a control channel and the PDSCH in the radio frame are transmitted in a time division multiplexing manner, the control channel is located at a position after the PDSCH, and the control channel includes at least a PDCCH and a PCFICH.

Optionally, a starting position of the to-be-transmitted data in the radio frame is a starting symbol of the PDSCH.

With the position indication information, the terminal is informed of the starting position of the to-be-transmitted data in the radio frame, such that the terminal may receive data in an accurate manner. The indicating approach in embodiments of the present disclosure is simple and efficient, obtained time-frequency resources can be sufficiently utilized and resources are not wasted.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Apparently, the ordinary skilled in the art can make various modifications and changes to the present disclosure without departing from the principle and scope of the present disclosure, and all those modifications and changes fall within protection scope of the present disclosure.

What is claimed is:

1. A method for transmitting data in an unauthorized frequency band, comprising:
   determining a starting position of a control channel in a radio frame in the unauthorized frequency band;
   determining position indication information based on the starting position; and
   transmitting the position indication information, to enable a terminal to obtain, within the radio frame, the starting position of the control channel in the radio frame in the unauthorized frequency band based on the position indication information;
   wherein the position indication information is a sequence agreed on by a network device and the terminal in advance; a symbol carrying the sequence is located at a position before to-be-transmitted data in the radio frame in time domain and there are N symbols between the symbol carrying the sequence and symbols carrying the to-be-transmitted data, wherein the sequence occupies all of a bandwidth or a specified portion of the bandwidth in frequency domain and N is an integer equal to or larger than 0; or
   the sequence occupies a specified portion of the bandwidth, and a symbol carrying the sequence overlaps a starting symbol for transmitting the to-be-transmitted data.

2. A method for transmitting data in an unauthorized frequency band, comprising:
   receiving, by a terminal, position indication information of a radio frame in an unauthorized frequency band, wherein the position indication information indicates a starting position of a control channel in the radio frame; and
   determining, by the terminal within the radio frame, the starting position of the control channel in the radio frame in the unauthorized frequency band based on the position indication information;

wherein the position indication information is a sequence agreed on by a network device and the terminal; wherein determining by the terminal the starting position of the control channel in the radio frame in the unauthorized frequency band based on the position indication information comprises;

determining, by the terminal, the sequence on a symbol in the radio frame that is located at a position before symbols carrying to-be-transmitted data and is N symbols away from the symbols carrying the to-be-transmitted data, wherein the sequence occupies all of a bandwidth or a specified portion of the bandwidth in frequency domain, and N is an integer equal to or larger than 0; or determining, by the terminal, the sequence on a starting symbol for transmitting the to-be-transmitted data, wherein the sequence occupies a specified portion of the bandwidth.

3. The method according to claim 2, wherein the position indication information is transmitted via a signaling, the signaling is carried on a specified symbol in the radio frame, and the specified symbol is agreed on by a network device and the terminal in advance.

4. The method according to claim 3, wherein receiving by the terminal the position indication information of the radio frame in the unauthorized frequency band comprises:

determining, by the terminal, the signaling based on a portion of a bandwidth of the specified symbol; or obtaining, by the terminal, the signaling from an auxiliary carrier in the unauthorized frequency band or from a main carrier in an authorized frequency band.

5. The method according to claim 2, wherein data is transmitted in a physical downlink shared channel (PDSCH) and an enhanced physical downlink control channel (ePDCCH) in the radio frame in a frequency division multiplexing manner, the PDSCH and the ePDCCH have an identical starting position and an identical ending position in time domain, and the starting position of the PDSCH and the ePDCCH in the time domain is located at any position in an L1/L2 control channel region of a complete subframe corresponding to the radio frame, or is located at any position outside the L1/L2 control channel region of the complete subframe corresponding to the radio frame.

6. The method according to claim 2, wherein data is transmitted in a control channel and a PDSCH in the radio frame in a time division multiplexing manner, the control channel is located at a position after the PDSCH, and the control channel comprises at least a physical downlink control channel (PDCCH) and a physical control format indicator channel (PCFICH).

7. The method according to claim 2, wherein the starting position of the control channel in the radio frame is a starting symbol of a PDSCH.

8. A network device, comprising:
a processor;
a memory connected to the processor via a bus interface and configured to store therein programs and data for the operation of the processor; and
a transceiver configured to receive and transmit data under control of the processor,
wherein in the case that the programs and data stored in the memory are called and executed by the processor, the processor is configured to:
determine a starting position of control channel in a radio frame in an unauthorized frequency band;

determine position indication information based on the starting position; and transmit the position indication information, to enable a terminal to determine, within the radio frame, the starting position of the control channel in the radio frame in the unauthorized frequency band based on the position indication information;

wherein the position indication information is a sequence agreed on by the network device and the terminal; a symbol carrying the sequence is located at a position before to-be-transmitted data in the radio frame in time domain and there are N symbols between the symbol carrying the sequence and symbols carrying the to-be-transmitted data, wherein the sequence occupies all of a bandwidth or a specified portion of the bandwidth in frequency domain, and N is an integer equal to or larger than 0; or the sequence occupies a specified portion of the bandwidth, and a symbol carrying the sequence overlaps a starting symbol for transmitting the to-be-transmitted data.

9. The network device according to claim 8, wherein the position indication information is transmitted via a signaling, the signaling is carried on a specified symbol in the radio frame, and the specified symbol is agreed on by the network device and the terminal in advance.

10. The network device according to claim 9, wherein the signaling occupies a portion of a bandwidth of the specified symbol; or the signaling is carried on an auxiliary carrier in the unauthorized frequency band, or is carried on a main carrier in an authorized frequency band.

11. The network device according to claim 8, wherein data is transmitted in a physical downlink shared channel (PDSCH) and an enhanced physical downlink control channel (ePDCCH) in the radio frame in a frequency division multiplexing manner, the PDSCH and the ePDCCH have an identical starting position and an identical ending position in time domain, and the starting position of the PDSCH and the ePDCCH in the time domain is located at any position in an L1/L2 control channel region of a complete subframe corresponding to the radio frame, or is located at any position outside the L1/L2 control channel region of the complete subframe corresponding to the radio frame.

12. The network device according to claim 8, wherein data is transmitted in a control channel and a PDSCH in the radio frame in a time division multiplexing manner, the control channel is located at a position after the PDSCH, and the control channel comprises at least a physical downlink control channel (PDCCH) and a physical control format indicator channel (PCFICH).

13. The network device according to claim 8, wherein the starting position of the control channel in the radio frame is a starting symbol of a PDSCH.

14. A terminal, comprising:
a processor;
a memory connected to the processor via a bus interface and configured to store therein programs and data for the operation of the processor; and
a transceiver, configured to receive and transmit data under control of the processor,
wherein in the case that the programs and data stored in the memory are called and executed by the processor, the processor is configured to:
receive position indication information of a radio frame in an unauthorized frequency band, wherein the position indication information indicates a starting position of a control channel in the radio frame; and determine, within the radio frame, the starting position of the control channel in the radio frame in the unauthorized frequency band based on the position indication information;

wherein the position indication information is a sequence agreed on by a network device and the terminal; and in the case that the programs and data stored in the memory are called and executed by the processor, the processor is further configured to:

determine the sequence on a symbol in the radio frame that is located at a position before symbols carrying to-be-transmitted data and is N symbols away from the symbols carrying the to-be-transmitted data, wherein the sequence occupies all of a bandwidth or a specified portion of the bandwidth in frequency domain, and N is an integer equal to or larger than 0; or determine the sequence on a starting symbol for transmitting the to-be-transmitted data, wherein the sequence occupies a specified portion of the bandwidth.

15. The terminal according to claim 14, wherein the position indication information is transmitted via a signaling, the signaling is carried on a specified symbol in the radio frame, and the specified symbol is agreed on by a network device and the terminal in advance.

16. The terminal according to claim 15, wherein in the case that the programs and data stored in the memory are called and executed by the processor, the processor is further configured to:

determine the signaling based on a portion of a bandwidth of the specified symbol; or obtain the signaling from an auxiliary carrier in the unauthorized frequency band or from a main carrier in an authorized frequency band.

* * * * *